(12) United States Patent
Tushinskiy (10) Patent No.: US 11,392,973 B2
(45) Date of Patent: *Jul. 19, 2022

(54) VOICE-BASED DISCOUNT OFFERS

(71) Applicant: INSTREAMATIC, INC., Palo Alto, CA (US)

(72) Inventor: Stanislav Tushinskiy, Mountain View, CA (US)

(73) Assignee: INSTREAMATIC, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/492,428

(22) Filed: Oct. 1, 2021

(65) Prior Publication Data

US 2022/0108342 A1 Apr. 7, 2022

Related U.S. Application Data

(63) Continuation-in-part of application No. 17/060,149, filed on Oct. 1, 2020, now Pat. No. 11,164,215.

(51) Int. Cl.
| | |
|---|---|
| *G06Q 30/00* | (2012.01) |
| *G06Q 30/02* | (2012.01) |
| *G10L 25/51* | (2013.01) |
| *H04W 4/23* | (2018.01) |
| *H04L 51/00* | (2022.01) |
| *H04W 4/02* | (2018.01) |
| *G06F 3/16* | (2006.01) |

(52) U.S. Cl.
CPC ......... *G06Q 30/0222* (2013.01); *G06F 3/165* (2013.01); *G10L 25/51* (2013.01); *H04L 51/00* (2013.01); *H04W 4/023* (2013.01); *H04W 4/23* (2018.02); *G06Q 30/0261* (2013.01)

(58) Field of Classification Search
None
See application file for complete search history.

(56) References Cited

U.S. PATENT DOCUMENTS

| | | | |
|---|---|---|---|
| 10,522,146 B1 * | 12/2019 | Tushinskiy | ............. G10L 15/22 |
| 10,614,487 B1 * | 4/2020 | Tushinskiy | ............. G10L 15/22 |
| 2020/0019979 A1 | 1/2020 | Truong | |
| 2020/0111133 A1 * | 4/2020 | Georgoff | ............ G06Q 30/0207 |

* cited by examiner

*Primary Examiner* — Meredith A Long
(74) *Attorney, Agent, or Firm* — Georgiy L. Khayet (57) ABSTRACT

Methods and systems for providing voice-based discount offers are provided. An example method includes sensing, by an acoustic sensor, an ambient acoustic signal; determining, by one or more processors communicatively coupled to a user device and the acoustic sensor, that the user device has played a question prompting a user to select an item from a plurality of items; in response to the determination, analyzing, by the one or more processors, the ambient acoustic signal to determine that the user has selected the item; and sending, by the one or more processors and via the user device, a message including the selected item to a remote computing system. The remote computing system is configured to select, based on the selected item, an offer from a plurality of offers and send the offer to the user device.

15 Claims, 5 Drawing Sheets

VOICE-BASED DISCOUNT OFFERS

CROSS REFERENCE TO RELATED APPLICATIONS

This application is a Continuation-in-Part of, and claims the priority benefit of, U.S. patent application Ser. No. 17/060,149, filed on Oct. 1, 2020, and entitled "Context-Based Voice-Related Advertisement Offers." The subject matter of the aforementioned application is incorporated herein by reference in its entirety.

TECHNICAL FIELD

This disclosure generally relates to the field of providing advertisements. More particularly, this disclosure relates to methods and systems for providing voice-based discount offers.

BACKGROUND

Media streams are widely used to deliver audio advertisements to users. However, most of the audio advertisements target a broad group of people. The current audio advertisements are not flexible enough with respect to the interests or needs of particular users when the advertisements are played via a media stream. Therefore, information provided in the advertisements, such as discount offers, may be irrelevant to the most users. There is a need for a convenient way to deliver relevant discount offers to specific users in order to increase the effectiveness of advertisement.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for providing voice-based discount offers. Some embodiments of the present disclosure may facilitate providing discount offers to a user of a user device based on items provided to the user in a question played by the user device and selected by the user.

According to an example embodiment, a system for providing voiced-based discount offers is disclosed. The system may include a user device, an acoustic sensor, and one or more processors communicatively coupled to the user device and the acoustic sensor. The acoustic sensor may be configured to sense an ambient acoustic signal. The one or more processors may be configured to determine that the user device has played a question prompting a user to select an item from a plurality of items. In response to the determination, the one or more processors may analyze the ambient acoustic signal to determine that the user has selected the item. The one or more processors may be further configured to send, via the user device, a message including the selected item to a remote computing system. The remote computing system may be configured to select, based on the selected item, an offer from a plurality of offers and send the offer to the user device.

According to another embodiment, a method for providing voice-based discount offers is disclosed. The method may commence with sensing, by an acoustic sensor, an ambient acoustic signal. The method may include determining, by one or more processors communicatively coupled to a user device and the acoustic sensor, that the user device has played a question prompting a user to select an item from a plurality of items. The method may further include analyzing, by the one or more processors and in response to the determination, the ambient acoustic signal to determine that the user has selected the item. The method may include sending, by the one or more processors and via the user device, a message including the selected item to a remote computing system. The remote computing system may be configured to select, based on the selected item, an offer from a plurality of offers and send the offer to the user device.

According to yet another aspect of the disclosure, a non-transitory processor-readable medium, which stores processor-readable instructions is provided. When the processor-readable instructions are executed by a processor, they cause the processor to implement the above-mentioned method for providing voice-based discount offers.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The technology described herein is concerned with systems and methods for providing voiced-based discount offers. Some embodiments of the present technology may facilitate providing discount offers to a user when the user interacts with a user device via a voice assistant. The discount offers provided to the user can be selected from a database of the discount offers based on relevance of the discount offers to products or services selected by the user in response to a question played to the user by the user device.

According to an example embodiment of the present disclosure, a system for providing voiced-based discount offers is disclosed. The system may include a user device, an acoustic sensor, and one or more processors communicatively coupled to the user device and the acoustic sensor. A user of the user device may listen to an audio or watch a video on the user device. The user device may recognize, using the acoustic sensor, that a question is being asked in the audio or video. The question may include a suggestion to select one category or option from a list. The user device may further recognize, using the acoustic sensor, that the user has selected a category or an option. Based on the recognition that the user has selected the category or the option, the user device may send the selected category or option to a remote server, also referred to herein as a remote computing system or a remote computing resource(s). The remote server may receive the selected category or option and select an appropriate offer related to the selected category or option from a current list of items available for sale. The remote server may send the offer back to the user device to be presented to the user.

Figure 1:
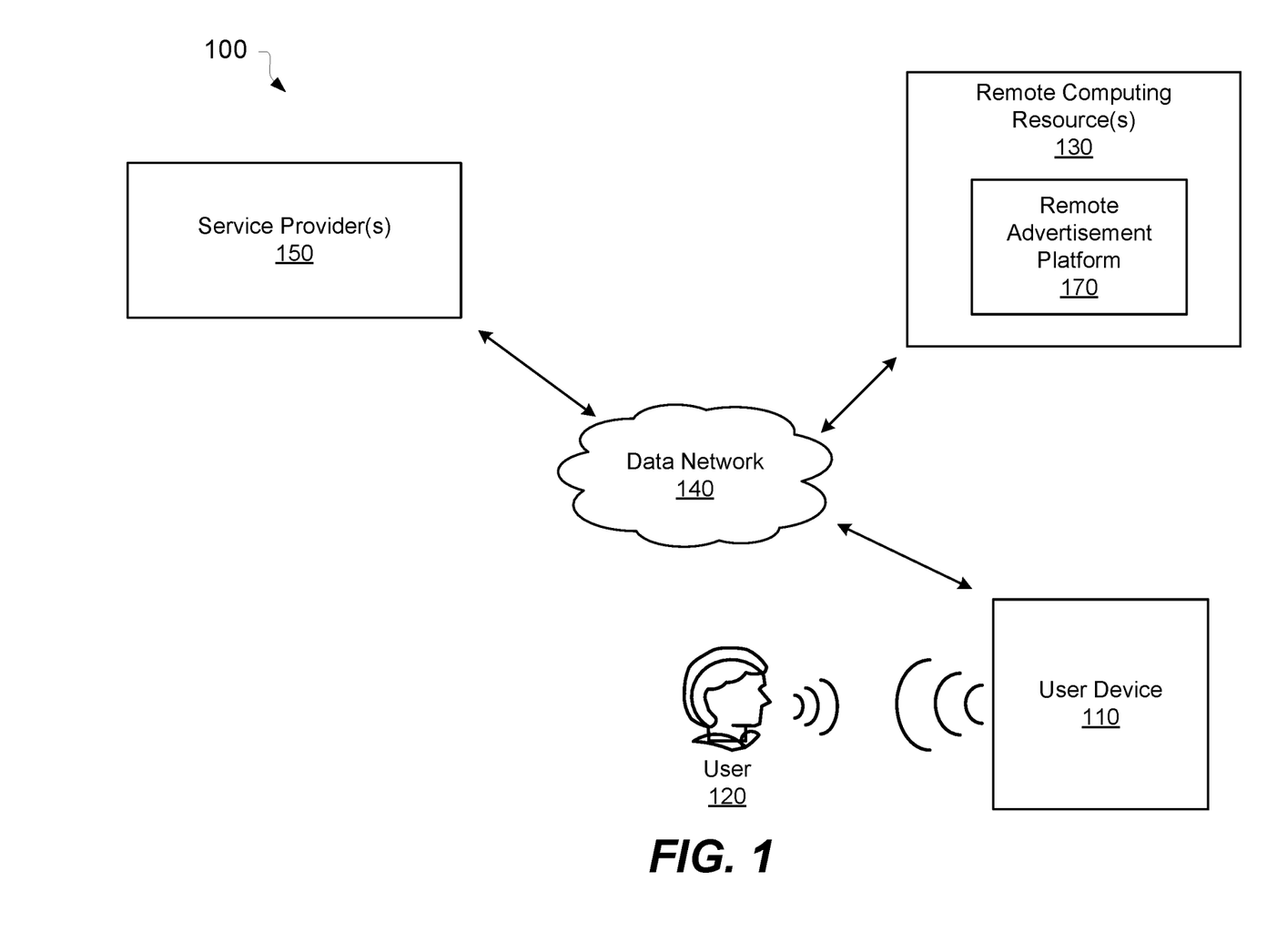
FIG. 1 is a block diagram showing an example environment, in which a system and a method for providing voiced-based discount offers can be implemented.

Referring now to the drawings, FIG. 1 shows an example environment 100, in which a system and a method for providing voiced-based discount offers can be implemented. The environment 100 may include a user device 110, a user 120, a remote computing resource(s) 130, a remote advertisement platform 170, a data network 140, and a service provider(s) 150.

The user device 110 can include any combination of radio frequency receivers, transmitters, and transceivers, wired and/or wireless telecommunications and/or networking devices, amplifiers, audio and/or video players, encoders, decoders, speakers, inputs, outputs, storage devices, and user input devices. The user device 110 can be configured to receive a media stream and play the media stream to the user 120 using an output device (for example, speakers or earphones). The user device 110 can be configured to sense ambient acoustic sound using, for example, one or more microphones. The user device 110 can be configured to detect the voice of the user 120 in the ambient acoustic sound. The user device 110 may include, but is not limited to, a laptop, a desktop computer, a tablet computer, a phablet, a personal digital assistant, a media player, a mobile telephone, a smart television set, in-vehicle infotainment, a smart home device, a car with a voice assistant system, a personal computing device including a voice assistant system, a smartphone, and the like. In general, the user device 110 may include any device having a voice assistant system. An example user device 110 is described in detail in FIG. 2.

In some embodiments, the user device 110 may include a communication unit to receive media streams via one or more media stream players. In certain embodiments, the media stream can be delivered using the data network 140. The data network 140 can refer to any wired, wireless, or optical networks including, for example, the Internet, intranet, local area network (LAN), Personal Area Network (PAN), Wide Area Network (WAN), Virtual Private Network, cellular phone networks (e.g., a Global System for Mobile (GSM) communications network, a packet switching communications network, a circuit switching communications network), Bluetooth™ radio, an Ethernet network, an IEEE 802.11-based radio frequency network, a Frame Relay network, an Internet Protocol (IP) communications network, or any other data communication network utilizing physical layers, link layer capability, or network layers to carry data packets, or any combinations of the above-listed data networks. In some embodiments, the data network 140 includes a corporate network, a data center network, a service provider network, a mobile operator network, or any combinations thereof.

In some embodiments, the remote computing resource(s) 130 may be implemented as a server(s) or a cloud-based computing resource(s) shared by multiple users. The remote computing resource(s) 130 can include hardware and software available at a remote location and accessible over the data network 140. The remote computing resource(s) 130 can be dynamically re-allocated based on demand. The cloud-based computing resource(s) may include one or more server farms/clusters including a collection of computer servers that can be co-located with network switches and/or routers.

The remote computing resource(s) 130 may include the remote advertisement platform 170. The user device 110 may be configured to track verbal communications of the user 120 and determine that the user 120 has selected an item from a plurality of items listed to the user 120 in a question played by the user device 110. A message including the selected item can be provided to the remote advertisement platform 170. Based on the selected item, the remote advertisement platform 170 can be configured to select an offer for the user 120. The offer can be selected from a plurality of offers provided by the service provider(s) 150. The remote advertisement platform 170 can send the offer to the user device 110. The user device 110 may play the offer via output devices of the user device 110.

In some example embodiments, the offer may include a voice message or a text message with a prompt for the user to visit an online store, a physical store, or a service location of the service provider(s) 150. In some embodiments, the service provider(s) 150 can include remote computing resource(s) associated with various commercial and non-commercial organizations.

In some example embodiments, the user device 110 can determine, via acoustic sensors of the user device 110, a reaction of the user to the question. For example, that the user device 110 can determine that the user 120 has rejected the question by replaying "Not interested." The user device 110 may provide information concerning the reaction of the user 120 to the remote advertisement platform 170. If the reaction of the user 120 is to reject the question, the remote advertisement platform 170 may not send any offers related to the question to the user 120. If the reaction of the user 120 is to accept the offer (e.g., the user 120 has selected one of options in the question), the remote advertisement platform 170 may send the offer concerning the selected option to the user device 110.

Figure 2:
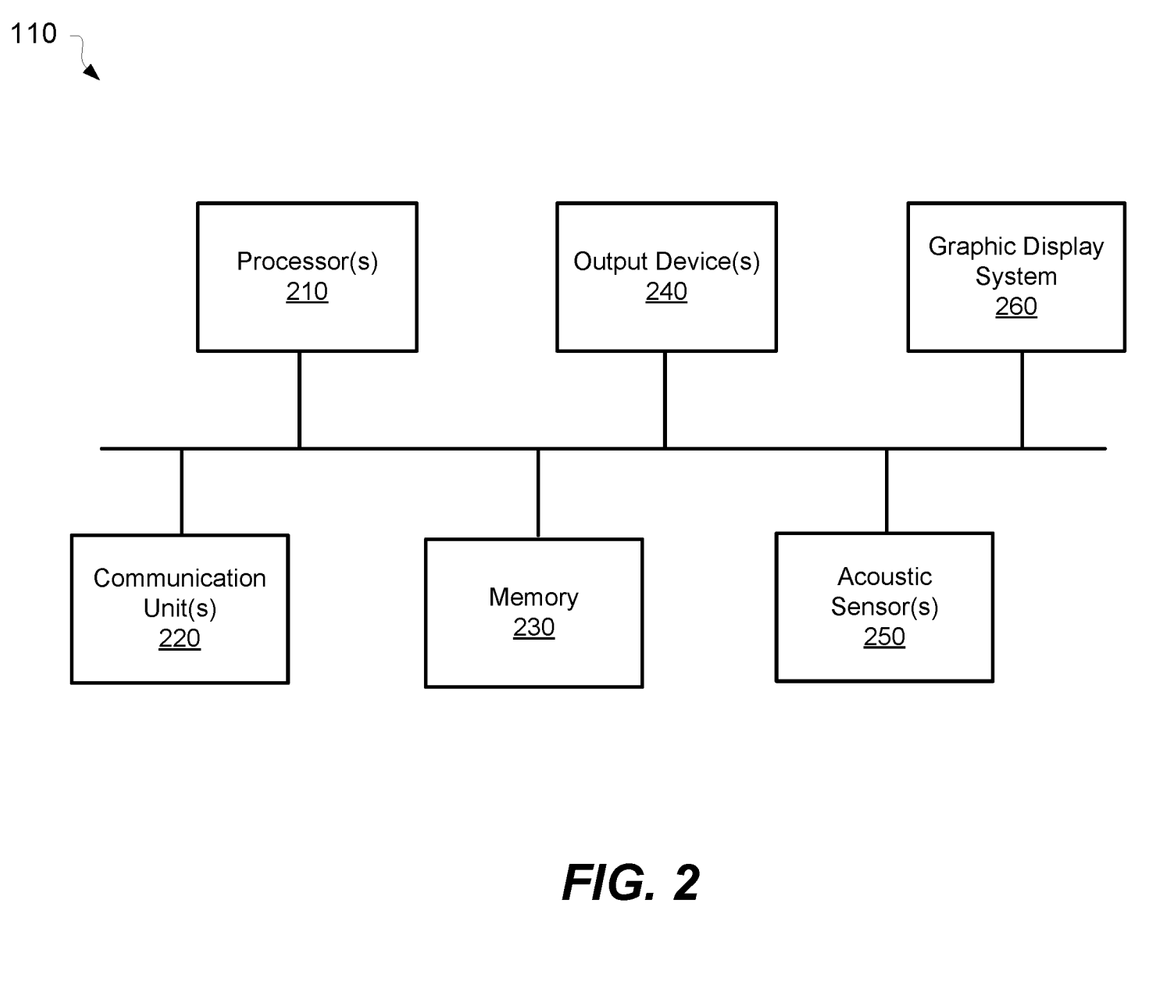
FIG. 2 is a block diagram showing a user device suitable for implementing a method for providing voiced-based discount offers, according to an example embodiment.

FIG. 2 is a block diagram showing a user device 110 suitable for implementing a method for providing voiced-based discount offers, according to an example embodiment. FIG. 2 provides details of the user device 110 of FIG. 1. In the illustrated embodiment, the user device 110 includes one or more processor(s) 210, one or more communication unit(s) 220, a memory 230, one or more output device(s) 240, one or more acoustic sensor(s) 250, and a graphic display system 260. In other embodiments, the user device 110 includes additional or other components necessary for operations of the user device 110. Similarly, in certain embodiments, the user device 110 includes fewer components that perform functions similar or equivalent to those depicted in FIG. 2.

In various embodiments, the processor(s) 210 may include hardware and/or software, which is operable to execute instructions stored in the memory 230. The processor(s) 210 may include general purpose processors, video processors, audio processing systems, and so forth. The processor(s) 210 may perform floating point operations, complex operations, and other operations, including performing speech recognition based on ambient acoustic signals captured by the acoustic sensor(s) 250 to detect verbal communication between a user and a voice assistant system of the user device 110 and analyzing the verbal communication to detect keywords associated with verbal communication of the user. The keywords said by the user may be matched with keywords present in the question played to the user by the user device 110. Upon matching the keywords, an item selected by the user from items presented in the question may be determined.

In various embodiments, the communication unit(s) 220 can be configured to communicate with a network such as the Internet, a WAN, a LAN, a cellular network, and so forth, to receive audio and/or video data of media streams. The received audio and/or video data may be then forwarded to the processor(s) 210 and the output device(s) 240.

The acoustic sensor(s) 250 can include one or more microphones. The processor(s) 210 can be configured to receive acoustic signals from an acoustic source, for example the user of the user device 110, via the acoustic sensor(s) 250 and process the acoustic signal to determine presence of keywords and/or commands in a voice of the user. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user of the user device 110). The output device(s) 240 may include one or more speaker(s), an earpiece of a headset, or a handset.

In various embodiments, the graphic display system 260 can be configured to provide a graphic user interface. In some embodiments, a touch screen associated with the graphic display system 260 can be utilized to receive an input from the user. The graphic display system 260 may be configured to display a video content of the media stream and advertisements.

Figure 3:
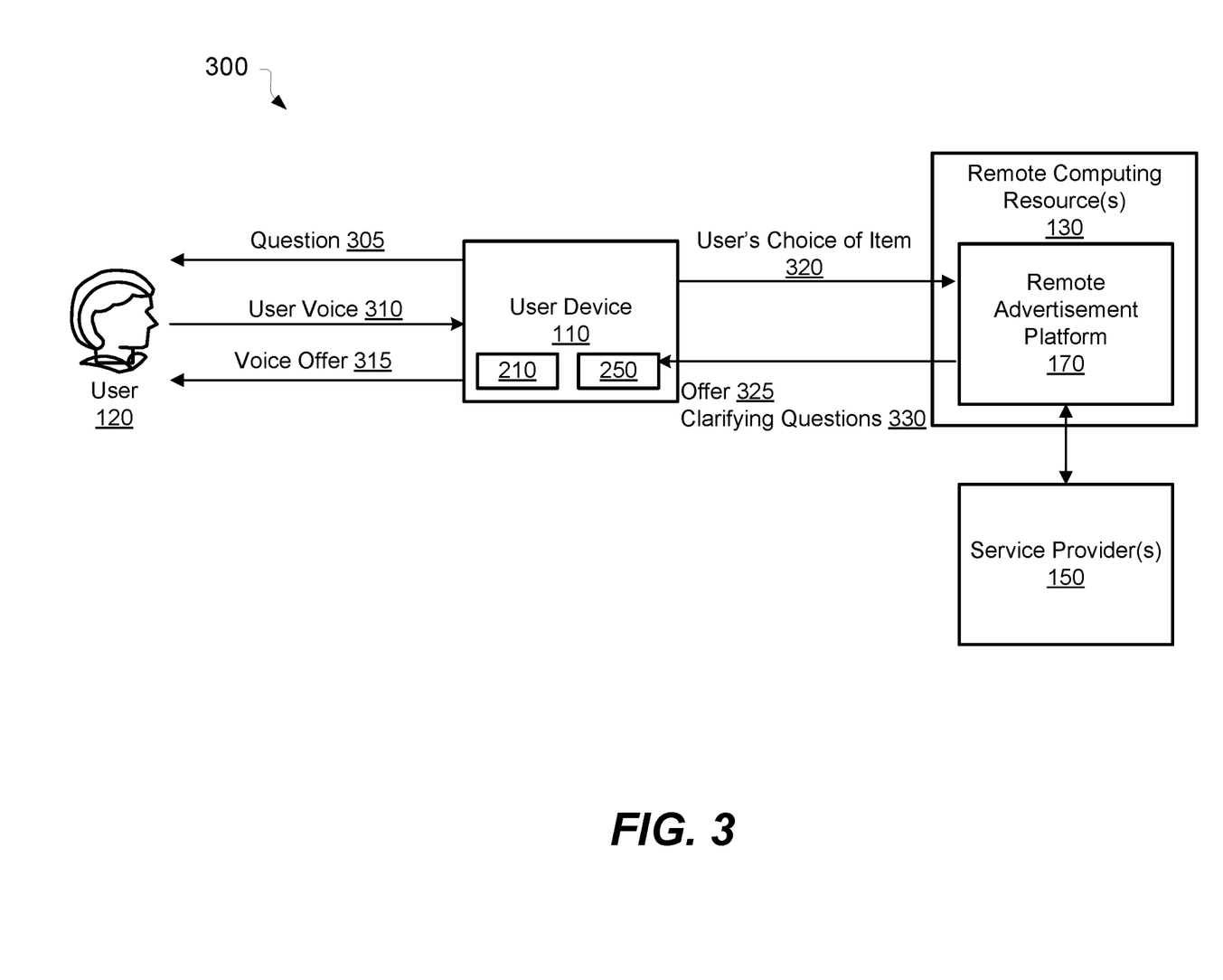
FIG. 3 is a block diagram illustrating an example system for providing voiced-based discount offers, according to an example embodiment.

FIG. 3 is a block diagram illustrating an example system 300 for providing voiced-based discount offers, according to an example embodiment. The system 300 may include a user device 110, an acoustic sensor 250 configured to sense an ambient acoustic signal, and one or more processors 210 communicatively coupled to the user device 110 and the acoustic sensor 250. The system 300 may be in communication with a remote computing system shown as a remote computing resource(s) 130 and a remote advertisement platform 170. The remote advertisement platform 170 may be in communication with a service provider(s) 150. In an example embodiment, the remote advertisement platform 170 can be implemented as one or more applications of the remote computing resource(s) 130.

In an example embodiment, a media stream may be provided to the user device 110. The media stream can be a live broadcast or a pre-recorded media stream (podcast). For example, the user 120 may listen to an audio or watch a video on the user device 110. A question 305 can be played within the media stream. The user device 110 may recognize that a question 305 is being asked. For example, the question 305 can be received as a metadata in the media stream and the user device 110 may recognize the metadata of the question 305 in the media stream. The question 305 may include a suggestion to select one item, such as a category or an option, from a list. Specifically, the one or more processors 210 of the user device 110 may be configured to determine that the user device 110 has played the question 305 prompting the user 120 of the user device 110 to select an item from a plurality of items. In response to the determination that the user device 110 has played the question 305, the one or more processors 210 may analyze the ambient acoustic signal to detect a user voice 310. Based on the analysis of the user voice 310 in the ambient acoustic signal, the one or more processors 210 may determine that the user 120 has selected at least one item, such as the category or the option, from the plurality of items listed in the question 305 that was played to the user 120. Based on the determination that the user 120 has selected at least one item, the one or more processors 210 may send, via the user device 110, a message including the selected item (shown as a user's choice 320 of the item) to the remote computing system.

The remote computing system may be configured to receive the message from the one or more processors 210 of the user device 110. Based on the received message, the remote computing system may select, based on the selected item, an offer 325 from a plurality of offers. The offer 325 may be associated with the item selected by the user 120. The remote computing system may send the offer 325 to the user device 110 to be presented to the user 120. In an example embodiment, the offer 325 can be played within the media stream. For example, the offer 325 can be received as a metadata in the media stream and the user device 110 may recognize the metadata of the offer 325 in the media stream.

In an example embodiment, the question 305 may include predetermined keywords related to options, i.e., to items present in the question 305 played to the user 120 by the user device 110. Upon receipt of the user voice 310, the remote computing system may analyze the user voice 310 to detect keywords that match keywords present in the question 305 and identify an item related to the keywords.

In further example embodiments, the remote computing system may also analyze the user voice 310 to determine the context provided by the user 120 in the user voice 310. For example, if the question 305 played to the user 120 is "Do you prefer product X, product Y, or product Z?," the user 120 may answer "The first one" instead of directly saying "Product X." The remote computing system may analyze the context related to the answer "The first one" and determine that the answer relates to "Product X."

In an example embodiment, the offer 320 may include a voice message shown as a voice offer 315. Upon receipt of the offer 320 by the user device 110, the one or more processors 210 of the user device 110 may be configured to cause the user device 110 to play back the voice offer 315 to the user 120. The voice offer 315 may include a prompt for the user 120 to visit an online store, a physical store, or a service location of a service provider 150. For example, the geographical location of the user device 110 may be used to select for the user 120 an offer to visit a physical store that is close to the geographical location of the user device 110.

In some example embodiments, if the remote computing system is unable to determine which item is selected by the user 120 in the user's choice 320, the remote computing system may send one or more clarifying questions 330 to the user device 110 to prompt the user 120 to clarify which item the user 120 selects. Upon receipt of the further user's choice 320, the remote computing system may select the offer 325 based on the item selected by the user 120 in the further user's choice 320.

For example, the advertisement (i.e., the question 305) may sound as follows: "Hey we have great offers for you. Which one is the most interesting to you: milk, steaks, or beer?" If the user 120 selects milk, the remote computing system can select service providers (e.g., brands) that offer products related to the "milk" category. The remote computing system may further select offers provided by the service providers for products in the "milk" category. The selections can be made based on predetermined criteria. Upon selection of the offers, the remote computing system can deliver the offer 325, e.g., in form of the message "Great. Visit your local store X and buy milk Y with a 20% discount," to the user device 110.

In an example embodiment, sending of the offer 325 may include sending a text message to the user device 110 or to an email account associated with the user 120. In a further example embodiment, the offer 325 may include a digital coupon. The user device 110 may be configured to add, upon receiving the offer 325, the digital coupon to a digital wallet associated with the user 120. In an example embodiment, the offer 325 may include a Uniform Resource Locator (URL) of a page. The user device 110 may be configured to open, upon receipt of the offer, the page in an Internet browser based on the URL.

In an example embodiment, the offer 325 may further include a question asking the user 120 if the user 120 wants to order the item and ship the item to a location of the user 120 or some other place. If the user 120 agrees to have the item delivered, the item may be delivered to the location of the user device 110 or to a geographical location selected by the user 120.

In an example embodiment, the one or more processors 210 of the user device 110 may be configured to send data concerning a geographical location of the user device 110 to the remote computing system. The selection of the offer 325 from the plurality of offers by the remote computing system may be based on the geographical location of the user device 110.

In an example embodiment, the selection of the offer and a method of delivery of the offer may be based on previous preferences of the user 120 and/or preferences of a seller or a product provider. For example, if the user 120 keeps choosing dairy products over alcohol, future offers can be tailored to dairy offers and skip beer.

In an example embodiment, the plurality of items may include one or more categories of products or one or more categories of services. Categories of the items in the plurality of items may be based on historical data concerning previous selections of items by the user 120 and/or a geographical location of the user device 110. For example, if the user device 110 is located in San Francisco, the categories of the items from which the offer is selected may include supplements, bread, and milk. If the user device 110 is located in New York, the categories of the items from which the offer is selected may include wine, fruit, and paper products.

Additionally, the same service provider may have different offers for stores located in different cities. For example, a store located in one city can have different offers that a store located in another city. The offer to be sent to the user 120 may be selected based on the city in which the user is located.

In some embodiments, the selection of the offer and the method of delivery of the offer to the user 120 may be based on an analysis of the ambient acoustic signal to identify the voice of the user 120 and a background of the ambient acoustic signal. Based on the analysis of the voice and the background, parameters associated with the user 120, the user device 110, and the user location or other parameters may be determined. For example, an emotion, an age, and a gender of the user 120 may be determined based on the voice of the user 120 and a location of the user 120 may be determined based on type of noise and a level of noise in the background (home, office, street, subway, or cafe). The parameters determined based on the ambient acoustic signal may be used for selection of offers for the user 120. Furthermore, the background noise may be analyzed for the presence of family members, children, or pets, so that an offer appropriate for the family members, children, or pets may be selected and provided to the user 120. To select offers or sales in stores nearest to the user device 110, Global Positioning System (GPS) data of the user device 110 and GPS data of stores stored in a database of the remote computing system or acquired from third parties may be used.

In a further example embodiment, questions and possible offers can be preliminarily received by the user device 110 from the remote computing system. The user device 110 may play one of the questions to the user 120. When the user 120 selects one of items from a list of items presented in the question, there is no need to send a user selection of the item to the remote computing system because all possible offers associated with all items from the list of items are already stored on the user device 110. Therefore, upon selection of the item by the user 120, the user device 110 may select an appropriate offer by itself and present the offer related to the item to the user 120.

Figure 4:
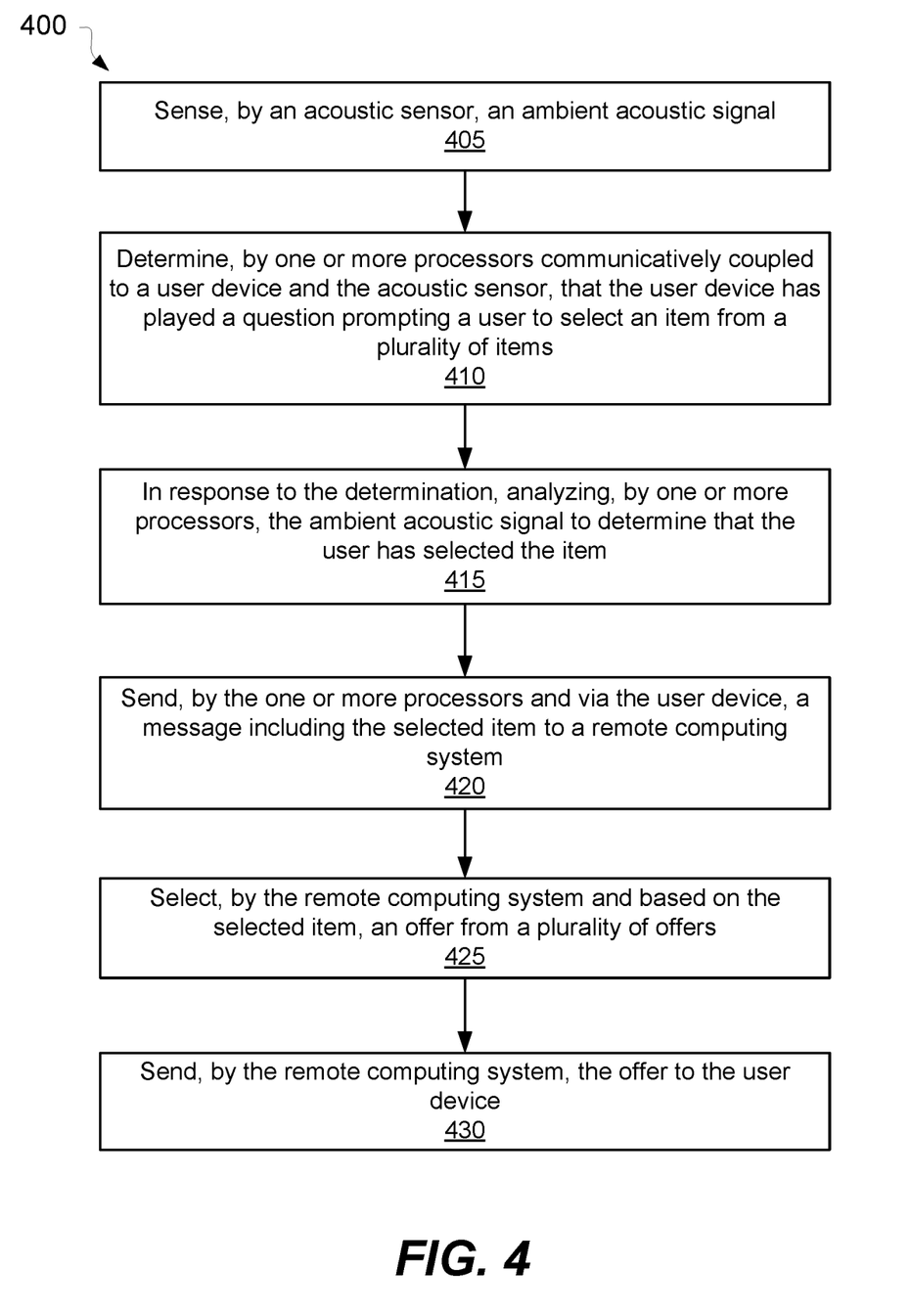
FIG. 4 is a flow chart showing a method for providing voiced-based discount offers, according to an example embodiment.

FIG. 4 is a flow chart showing a method 400 for providing voice-based discount offers, according to an example embodiment. The method 400 can be implemented by using the system 300 shown in FIG. 3. For example, the method 400 can be implemented as instructions stored in a memory of a user device which, when being executed by the processors of the user device, may cause the user device to perform the operations of the method 400. In some embodiments, the operations of method 400 may be combined, performed in parallel, or performed in a different order. The method 400 may also include additional or fewer operations than those illustrated.

The method 400 may commence in block 405 with sensing an ambient acoustic signal by an acoustic sensor associated with a user device. In block 410, the method 400 may include determining, by one or more processors communicatively coupled to the user device and the acoustic sensor, that the user device has played a question prompting a user to select an item from a plurality of items. In an example embodiment, the plurality of items may include one or more categories of products or one or more categories of services. Categories of the items in the plurality of items may be based on at least one of the following: historical data concerning previous selection of items by the user, a geographical location of the user device, and other parameters.

In block 415, the method 400 may include analyzing, by the one or more processors and in response to the determination, the ambient acoustic signal to determine that the user has selected the item. In block 420, the method 400 may include sending, by the one or more processors and via the user device, a message including the selected item to a remote computing system.

In block 425, the method 400 may include selecting, by the remote computing system and based on the selected item, an offer from a plurality of offers. In block 430, the method 400 may include sending, by the remote computing system, the offer to the user device. In some example embodiments, sending of the offer may include sending a text message to the user device or an email account associated with the user.

In an example embodiment, the offer may include a voice message. The one or more processors may be configured to cause the user device to play back the voice message. In some example embodiments, the voice message may include a prompt for the user to visit an online store, a physical store, or a service location of a provider. In a further example embodiment, the offer may include a digital coupon. The user device may be configured to add, upon receiving the offer, the digital coupon to a digital wallet associated with the user. In some example embodiments, the offer may include an URL of a page. The user device may be configured to open, upon receipt of the offer, the page in an Internet browser based on the URL.

The method 400 may further include sending, by the one or more processors, data concerning a geographical location of the user device to the remote computing system. In this embodiment, the selection of the offer from the plurality of offers by the remote computing system may be based on the geographical location of the user device.

Figure 5:
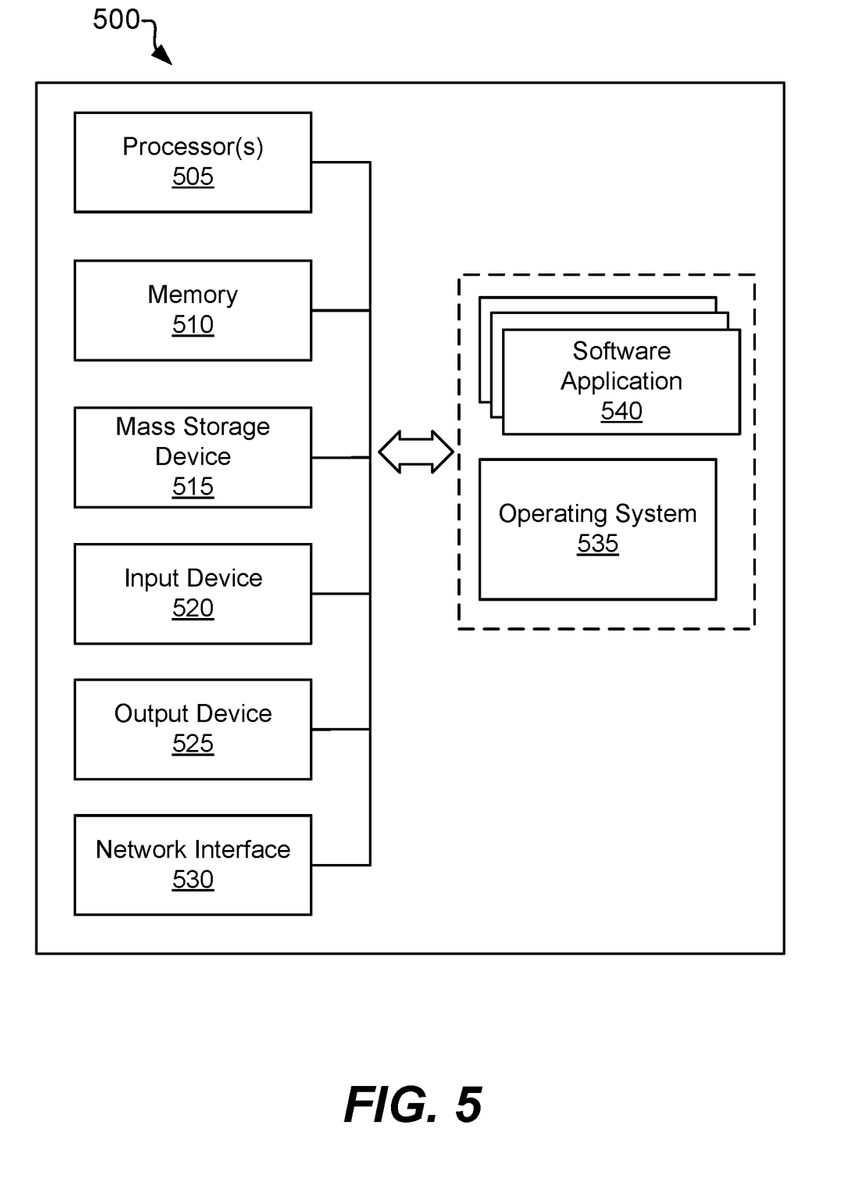
FIG. 5 is a high-level block diagram illustrating an example computer system, within which a set of instructions for causing the machine to perform any one or more of the methodologies discussed herein can be executed.

FIG. 5 is a high-level block diagram illustrating an example computer system 500, within which a set of instructions for causing the machine to perform any one or more of the methodologies discussed herein can be executed. The computer system 500 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 500 is an example of a user device(s) 110 or a remote computer resource(s) 130 shown in FIG. 1. Notably, FIG. 5 illustrates just one example of the computer system 500 and, in some embodiments, the computer system 500 may have fewer elements/modules than shown on FIG. 5 or more elements/modules than shown on FIG. 5.

The computer system 500 may include one or more processors 505, a memory 510, one or more mass storage devices 515, one or more input devices 520, one or more output devices 525, and a network interface 530. The one or more processors 505 are, in some examples, configured to implement functionality and/or process instructions for execution within the computer system 500. For example, the processors 505 may process instructions stored in the memory 510 and/or instructions stored on the mass storage devices 515. Such instructions may include components of an operating system 535 or software applications 540. The computer system 500 may also include one or more additional components not shown in FIG. 5, such as a housing, a power supply, a battery, a global positioning system (GPS) receiver, and so forth.

The memory 510, according to one example, is configured to store information within the computer system 500 during operation. The memory 510, in some example embodiments, may refer to a non-transitory computer-readable storage medium or a computer-readable storage device. In some examples, the memory 510 is a temporary memory, meaning that a primary purpose of the memory 510 may not be long-term storage. The memory 510 may also refer to a volatile memory, meaning that the memory 510 does not maintain stored contents when the memory 510 is not receiving power. Examples of volatile memories include random access memories (RAM), dynamic random-access memories (DRAM), static random-access memories (SRAM), and other forms of volatile memories known in the art. In some examples, the memory 510 is used to store program instructions for execution by the processors 505. The memory 510, in one example, is used by software (e.g., the operating system 535 or the software applications 540). Generally, the software applications 540 refer to software applications suitable for implementing at least some operations of the methods for providing voice-based discount offers as described herein.

The one or more mass storage devices 515 can also include one or more transitory or non-transitory computer-readable storage media and/or computer-readable storage devices. In some embodiments, the mass storage devices 515 may be configured to store greater amounts of information than memory 510. The mass storage devices 515 may further be configured for long-term storage of information. In some examples, the mass storage devices 515 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 5, the computer system 500 may also include one or more input devices 520. The input devices 520 may be configured to receive input from a user through tactile, audio, video, or biometric channels. Examples of the input devices 520 may include a keyboard, a keypad, a mouse, a trackball, a touchscreen, a touchpad, a microphone, one or more video cameras, image sensors, fingerprint sensors, or any other device capable of detecting an input from a user or other source and relaying the input to the computer system 500, or components thereof.

The output devices 525, in some examples, may be configured to provide output to the user through visual or auditory channels. The output devices 525 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to the user. The output devices 525 may also include a touchscreen, a presence-sensitive display, or other input/output capable displays known in the art.

The computer system 500, in some example embodiments, also includes a network interface 530. The network interface 530 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 530 may be a network interface card, such as an Ethernet card, an optical transceiver, a radio frequency transceiver, or any other type of device that can send and receive information.

The operating system 535 may control one or more functionalities of computer system 500 and/or components thereof. For example, the operating system 535 may interact with the software applications 540 and may facilitate one or more interactions between the software applications 540 and components of the computer system 500. As shown in FIG. 5, the operating system 535 may interact with or be otherwise coupled to the software applications 540 and components thereof. In some embodiments, the software applications 540 may be included in the operating system 535. In these and other examples, virtual modules, firmware, or software may be part of the software applications 540.

Thus, methods and systems for providing voice-based discount offers have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for providing voiced-based discount offers, the system comprising:
   a user device;
   an acoustic sensor configured to sense an ambient acoustic signal; and
   one or more processors communicatively coupled to the user device and the acoustic sensor, the one or more processors being configured to:
      analyze ambient acoustic signal to track verbal communications of a user with the user device and determine context of the verbal communications;
      generate a record of voice of the user; and
      send, via the user device, a message including the context and the record of the voice of the user to a remote computing system, wherein the remote computing system is configured to:
         determine based on the record of voice of the user a voice fingerprint;
         select, based on the context and the voice fingerprint, an offer from a plurality of offers; and
         send the offer to the user device.

2. The system of claim 1, wherein:
   the offer includes a voice message; and
   the one or more processors are configured to cause the user device to play back the voice message.

3. The system of claim 2, wherein the voice message includes a prompt for the user to visit at least one of the following: an online store, a physical store, and a service location of a provider.

4. The system of claim 1, wherein the sending the offer includes sending a text message to the user device or an email account associated with the user.

5. The system of claim 1, wherein:
   the offer includes a digital coupon; and
   the user device is configured to, upon receiving the offer, add the digital coupon to a digital wallet associated with the user.

6. The system of claim 1, wherein:
   the offer includes a Uniform Resource Locator (URL) of a page; and
   the user device is configured to, upon receipt of the offer, open the page in an Internet browser based on the URL.

7. The system of claim 1, wherein:
   the one or more processors are configured to send data concerning a geographical location of the user device to the remote computing system; and
   the selecting the offer from the plurality of offers is based on the geographical location of the user device.

8. A method for providing voice-based discount offers, the method comprising:
   sensing, by an acoustic sensor, an ambient acoustic signal;
   analyzing, by one or more processors communicatively coupled to a user device and the acoustic sensor, the ambient acoustic signal to track verbal communications of a user with the user device and determine context of the verbal communications;
   generating, by the one or more processors, a record of voice of the user; and
   sending, by the one or more processors and via the user device, a message including the context and the record of the voice of the user to a remote computing system, wherein the remote computing system is configured to:
      determine, based on the record of voice of the user, a voice fingerprint;
      select, based on the context and the voice fingerprint, an offer from a plurality of offers; and
      send the offer to the user device.

9. The method of claim 8, wherein:
   the offer includes a voice message; and
   the one or more processors are configured to cause the user device to play back the voice message.

10. The method of claim 9, wherein the voice message includes a prompt for the user to visit at least one of the following: an online store, a physical store, and a service location of a provider.

11. The method of claim 8, wherein the sending the offer includes sending a text message to the user device or an email account associated with the user.

12. The method of claim 8, wherein:
    the offer includes a digital coupon; and
    the user device is configured to, upon receiving the offer, add the digital coupon to a digital wallet associated with the user.

13. The method of claim 8, wherein:
    the offer includes a Uniform Resource Locator (URL) of a page; and
    the user device is configured to, upon receipt of the offer, open the page in an Internet browser based on the URL.

14. The method of claim 8, further comprising sending, by the one or more processors, data concerning a geographical location of the user device to the remote computing system, and wherein the selecting the offer from the plurality of offers is based on the geographical location of the user device.

15. A non-transitory processor-readable medium having instructions stored thereon, which when executed by one or more processors, cause the one or more processors to implement a method for providing voice-based discount offers, the method comprising:
    sensing, by an acoustic sensor, an ambient acoustic signal;
    analyzing, by one or more processors communicatively coupled to a user device and the acoustic sensor, the ambient acoustic signal to track verbal communications of a user with the user device and determine context of the verbal communications;
    generating, by the one or more processors, a record of voice of the user; and
    sending, by the one or more processors and via the user device, a message including the context and the record of the voice of the user to a remote computing system, wherein the remote computing system is configured to:
       determine, based on the record of voice of the user, a voice fingerprint;
       select, based on the context and the voice fingerprint, an offer from a plurality of offers; and
       send the offer to the user device.

* * * * *